United States Patent [19]
Brazell et al.

[11] Patent Number: 5,379,815
[45] Date of Patent: Jan. 10, 1995

[54] FOLDABLE EXTENSION TABLE FOR A CIRCULAR TABLE SAW

[76] Inventors: Kenneth M. Brazell, 11447 S. 46th St., Phoenix, Ariz. 85044; Robert G. Everts, 2050 N. 90th Pl., Chandler, Ariz. 85224; Chi-Kin Chiang, 4519 E. Saudia St., Phoenix, Ariz. 85044

[21] Appl. No.: 106,236

[22] Filed: Aug. 13, 1993

[51] Int. Cl.[6] .................................. B25H 1/00
[52] U.S. Cl. ........................... 144/287; 83/402; 83/451; 83/477.2; 108/65; 108/69; 144/286 R; 269/21
[58] Field of Search ............. 108/65, 69, 73; 269/21; 83/402, 451, 574, 477.2; 144/1 R, 286 R, 286 A, 287

[56] References Cited

U.S. PATENT DOCUMENTS

| | | | |
|---|---|---|---|
| 1,864,840 | 6/1932 | Lehnen | 144/287 |
| 2,505,658 | 4/1950 | Wilson | 144/285 |
| 2,555,217 | 6/1948 | Young . | |
| 3,648,628 | 3/1972 | Davis | 108/73 |
| 4,068,551 | 1/1978 | Kreitz . | |
| 4,106,381 | 8/1979 | Kreitz . | |
| 4,161,974 | 7/1979 | Patterson | 144/287 |
| 4,640,326 | 2/1987 | Hewitt | 144/287 |
| 4,827,819 | 5/1989 | O'Banion et al. | 144/285 |
| 4,874,025 | 10/1989 | Cleveland | 144/287 |
| 4,934,423 | 6/1990 | Withrow . | |
| 5,004,029 | 4/1991 | Garner | 144/287 |
| 5,018,563 | 5/1991 | Yoder . | |

OTHER PUBLICATIONS

Ryobi Owner's Operating Manual 10 Table Saw/Bt-30-00-Jun, 1991.

*Primary Examiner*—W. Donald Bray
*Attorney, Agent, or Firm*—Brooks & Kushman

[57] ABSTRACT

A table saw is disclosed comprising a main saw unit and an extension table assembly attachment. The extension table assembly includes an extension table having a first end and a second end hinges for pivotably attaching one end of the extension table to a guide rail of the table saw proximate the discharge end of the table saw, and a retractable leg. The leg is pivotably mounted to the extension table to allow the leg to move between a folded position wherein the leg lies substantially flush with the extension table and an extended position wherein the leg is adapted to support the extension table. The bracket which mounts the leg to the extension table is also adapted to lock the leg in either the folded or extended position.

17 Claims, 3 Drawing Sheets

FOLDABLE EXTENSION TABLE FOR A CIRCULAR TABLE SAW

TECHNICAL FIELD

This invention relates to a circular table saw having a rotatable blade for cutting a workpiece, and more particularly to a foldable extension table assembly which supports the workpiece exiting from the table saw.

BACKGROUND ART

Generally, a table saw for cutting a workpiece has a circular saw table formed with an elongated generally rectangular opening through which a circular saw blade projects. The workpiece is supported on the saw table and moved in a longitudinal direction over the table during cutting.

Often, the table saw includes front and rear guide rails extending in a direction transverse to the longitudinal cutting direction. These guide rails mount a rip fence for movement in the transverse direction. The rip fence is fixedly positionable to the guide rails to a dimension of the workpiece to be cut.

Workpieces of sufficient size and weight, such as a four feet by eight feet plywood sheet, are difficult to move on the saw table. Moving such large workpieces can cause fatigue to an operator and can also result in inaccuracy in the cutting due to starting and stopping of the workpiece during cutting. This is particularly true when no provision is made to support the workpiece as it is exiting from the discharge end of the table saw.

Extension tables have therefore been proposed for use with a saw table to provide support for large workpieces. For example, U.S. Pat. No. 4,068,551 to Kreitz discloses an extension table for power saws in which the distal end of the table is supported by folding legs and the proximal end of the table is pivotally connected to one edge of the normal worktable. U.S. Pat. No. 4,106,381, also to Kreitz, discloses a folding extension table which is designed to permit miter gauge rods to slide forward without interfernce.

SUMMARY OF THE INVENTION

The present invention is a table saw comprising a main saw unit and a foldable extension table assembly attachment. The main saw unit includes a generally planar support surface, a circular saw projecting at least partially through the support surface, and a pair of guide rails extending from the main saw unit in a direction generally transverse to the direction of rotation of the circular saw.

The extension table assembly includes an extension table having a first end and a second end, means for pivotably attaching the first end of the extension table to one of the guide rails of the table saw proximate the discharge end of the table saw, and a retractable leg. Hinge means are provided for pivotably mounting the leg to the extension table to allow the leg to move between a folded position wherein the leg lies substantially flush with the extension table and an extended position wherein the leg is adapted to support the extension table. Locking means are also provided for locking the leg in the extended position.

Accordingly, it is an object of the present invention to provide an foldable extension table assembly for a table saw of the type described above which is hinged to a guide rail at the discharged of a table.

Another object of the present invention is to provide an extension table assembly of the type described above that is foldable against the main saw unit during non-use without interfering with any dust collection hoses or dust collection bags provided on the main saw unit.

These and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
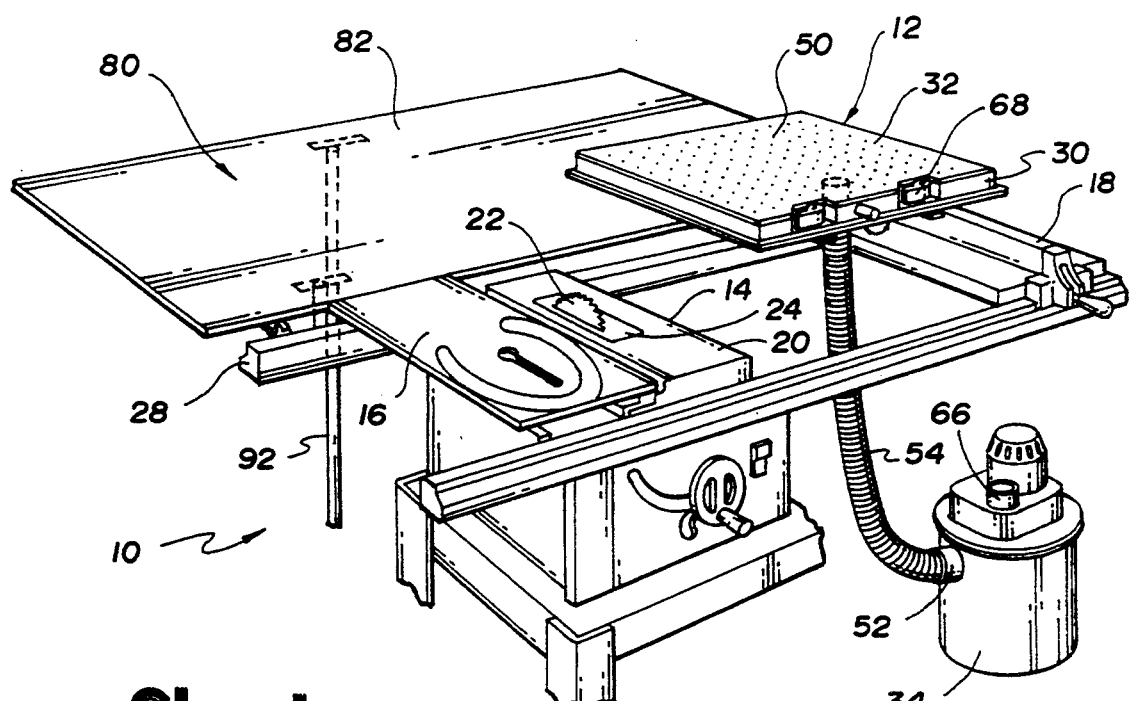
FIG. 1 is a perspective view of a circular saw table having a rotatable blade for cutting a workpiece, front and rear guide rails and a movable fence mounted on the rails and illustrating an air table connected to a shop vacuum.

With reference to the drawings, the preferred embodiments of the present invention will be described. FIG. 1 shows an improved table saw 10 according to the present invention including an air table 12 for supporting a workpiece (not shown), either while the workpiece is being cut on the table saw or while another forming operation such as routing is being performed. As described more fully below, the air table alternately utilizes blowing air to slightly elevate the workpiece on a cushion of air, or sucking air to clamp the same or a different workpiece while performing the other forming operations.

The table saw 10 comprises a main saw unit 14, a sliding miter table 16, the air table 120 and a movable rip fence 18 for determining a cutting dimension of the workpiece. The main saw unit 14 includes a generally planar support surface 20, a circular saw 22 projecting at least partially through an elongated generally rectangular opening 24 in the support surface, and a pair of guide rails 26 and 28 extending from the main saw unit in a direction generally transverse to the direction of rotation of the circular saw. Various details of this arrangment are disclosed in U.S. Pat. No. 5,040,444 to Shiotani et al., U.S. Pat. No. 5,116,249 to Shiotani et al., U.S. Pat. No. 5,123,317 to Barnes, Jr. et al., and U.S. Pat. No. 5,201,863 to Peot, all of which are hereby incorporated by reference.

Figure 2:
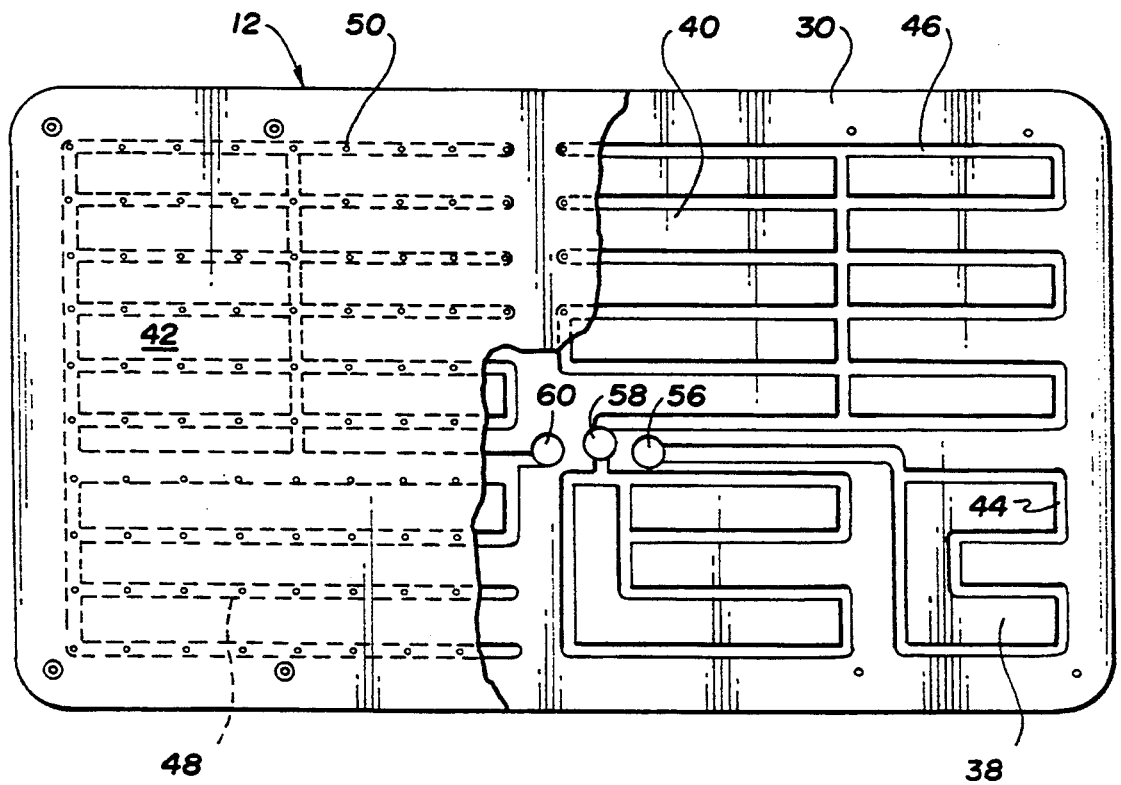
FIG. 2 is a sectional plan view of the table.

The air table 12 includes a body portion 30, a generally planar table top 32, a shop vacuum 34, and a connector or manifold 36 attached to the underside of the body portion. As best shown in FIG. 2, the body portion 30 has three separate subsections 38, 40 and 42 formed therein. The body portion 30 is preferably conventional particle board, and the subsections 38, 40 and 42 are each formed with a plurality of interconnected passageways respectively 44, 46 and 48 routed out of the particle board. The table top 32 is laminated or otherwise attached to the body portion 30 to cover the subsections, and has a plurality of holes 50 therethrough aligned generally over the passageways 44, 46 and 48.

Figure 3:
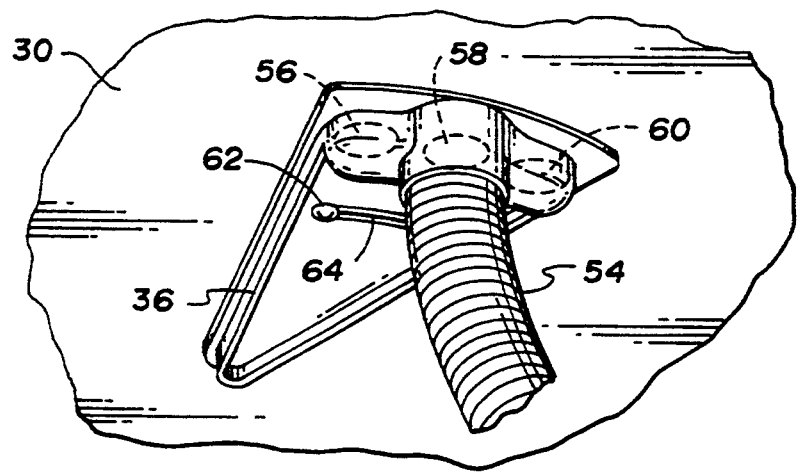
FIG. 3 is a bottom perspective view of underside of the air table showing a valving system for controlling air flow to or from subsections of the air table.

An inlet port 52 of the shop vacuum 34 is connected through a hose 54 to the manifold 36 so that the shop vacuum funtions to produce at least a partial vacuum at the manifold. As shown in FIG. 3, the manifold 36 is pivotable to uncover one or more of three ports 56, 58 and 60 formed in the bottom of the body portion 30. Means such as a screw 62 which rides in a slot 64 in the manifold are also provided to retain the manifold in the desired position. The ports 56, 58 and 60 are respectively in communication with the passageways 44, 46 and 48 of the subsections 38, 40 and 42 such that the manifold 36 functions as a valve means for selectively communicating at least a portion of the vacuum produced by the vacuum means to one or more of the subsections.

For example, when only port 56 is covered by the manifold 36, a clamping force is produced in the subsection 38 in the lower righthand corner of the table top 32. When ports 56 and 58 are covered, a clamping force is produced in the subsections 38 and 40 encompassing the entire righthand half of the table top 32. If the manifold 36 is positioned to cover all the ports 56, 58 and 60, a clamping force is generated in all of the subsections 38, 40 and 42 and thus over all of the table top 32. A suction force for inhibiting movement of the workpiece over the table top 32 can thereby be produced over a variable portion of the table top which diminishes or obviates the need for mechanical clamps. Of course, it should be appreciated that the hose 54 can alternately be connected to an outlet port 66 of the shop vacuum 34 to communicate pressurized air to the manifold 36 and therefore, depending on the orientation of the manifold, to one or more of the subsections. Thus the air blowing through the holes 50 in the table top 32 will generate a cushion of air to slightly elevate the workpiece, which may be advantageous for example while cutting a large workpiece.

Figure 4:
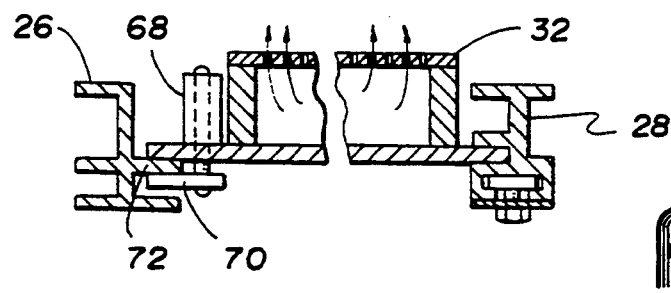
FIG. 4 is a sectional elevational view of the air table illustrating its mounting on the front and rear guide rails.

The air table 12 is mounted on the front and rear guide rails 26 and 28 adjacent the main saw unit 14 in like fashion to the miter table 16 and the rip fence 18. As shown in FIG. 4, a pair of locking levers 68 are provided to draw corresponding locking cams 70 up against a flange 72 of the front rail 26, preferably to position the perforated table top 32 substantially coplanar with the main support surface 20. Because the locking levers 68 are easily loosened, the air table 12 is movable along the guide rails 26 and 28 in the direction transverse to the rotation of the saw blade 22, for instance to adjust the position of the air table generally beneath the center of gravity of the workpiece. Additionally, the air table 12 is easily positionable on the guide rails on either side of the main saw unit 14.

Figure 5:
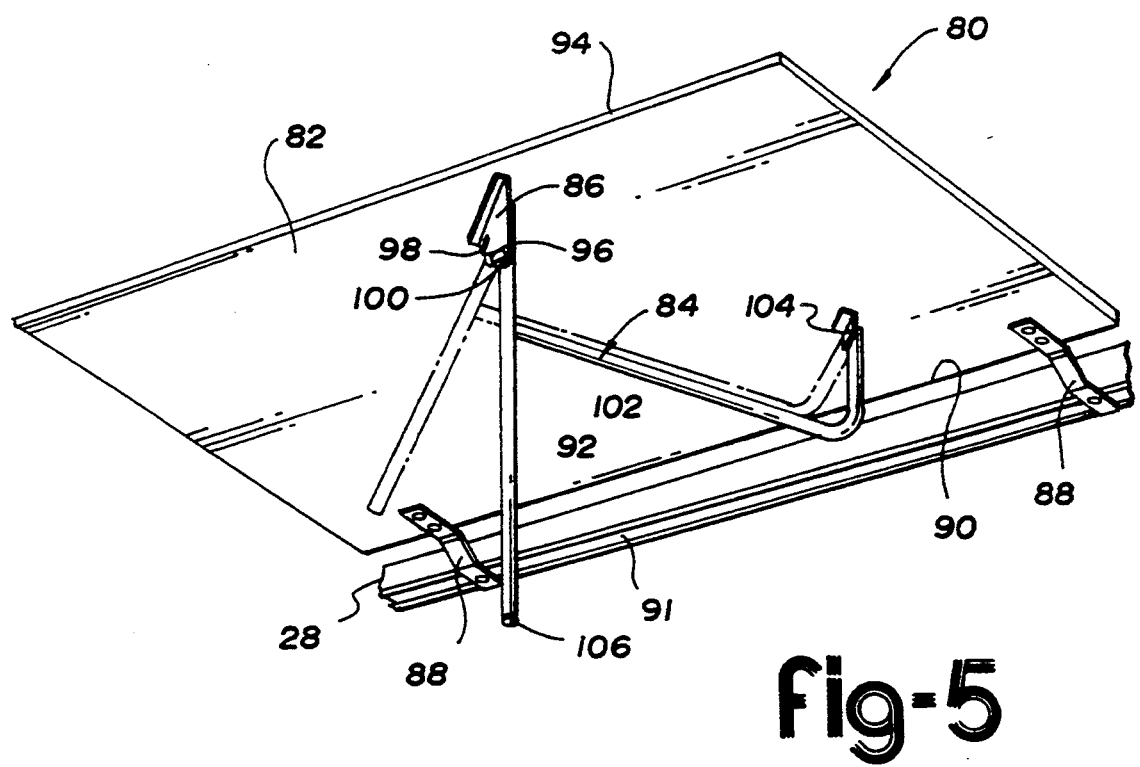
FIG. 5 is a perspective view of the circular saw table including a quick fold table extension assembly.
Figure 6:
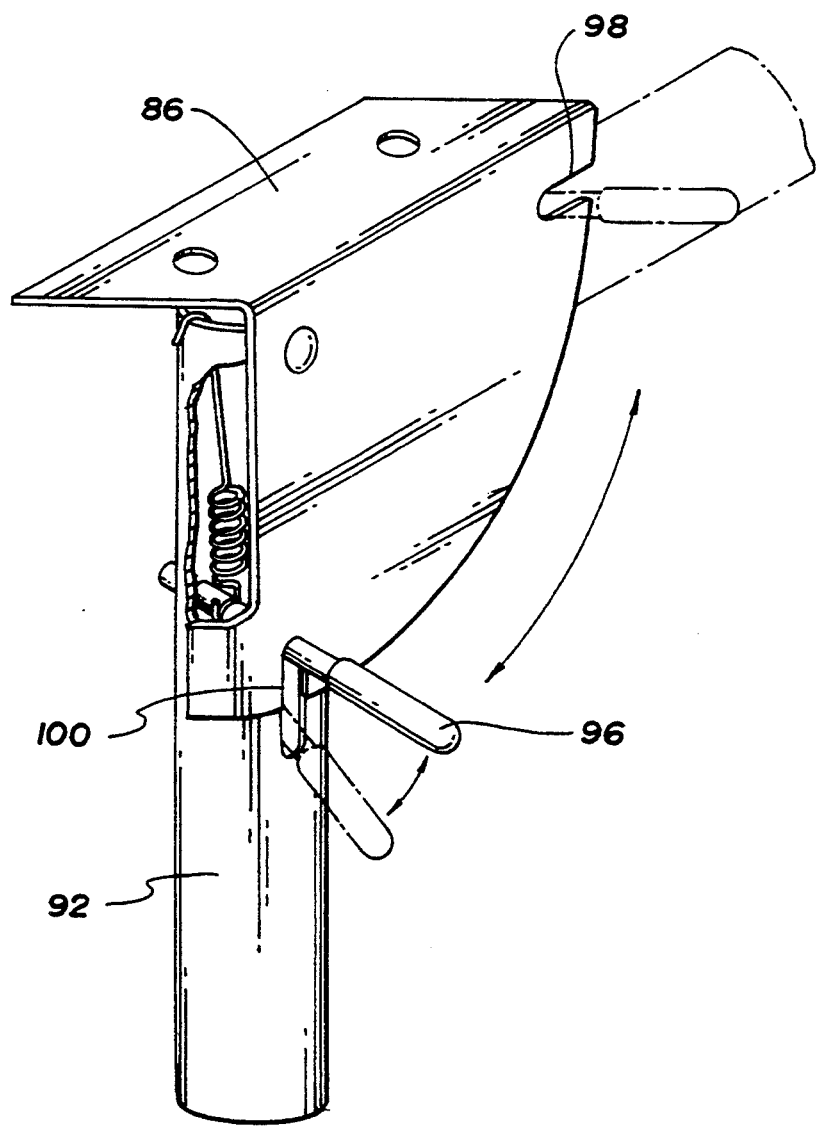
FIG. 6 is a perspective view of a mounting bracket for the table extension assembly.

FIGS. 5 and 6 show a quick fold table extension assembly 80 which provides a portable, self-supporting work surface for accomodating large workpieces exiting from the discharge end of the table saw 10. The foldable extension table assembly 80 comprises a generally planar, rectangular extension table 82, a retractable or foldable leg 84 and a mounting bracket 86. Means such as hinges 88 are provided for pivotably attaching one end 90 of the extension table to a bottom slot 91 of the rear guide rail 28 proximate the discharge end of the table saw.

The mounting bracket 86 is fastened to the underside of the extension table 82, and pivotably mounts a main fork 92 of the leg 84 proximate the middle of a distal end 94 of the extension table to allow the leg to move between a folded position shown in phantom and an extended use position. A spring loaded lever 96 which extends through the main fork 92 is adapted to selectively engage notches 98 and 100 in the bracket 86 to provide a means of locking the leg 84 in the folded or extended position, respectively. To accomodate this pivotal movement, a branch portion 102 of the leg is provided with a conventional pin-type hinge 104.

In the folded position, the leg 84 lies diagonally across and substantially flush with the bottom of the extension table 82. With the leg in the folded position, the extension table is allowed to lie substantially flush with the rear side of the table saw 10 without interfering with any dust collection hose and/or dust collection bag frequently mounted to the back of the unit. When the extension table 82 is so folded for storage or during non-use, the extension table is easily moved with the table saw.

In the extended position, the leg 84 extends from the extension table 82 at an angle of about 90 degrees to support the extension table off the floor or ground. The leg 84 is may be longer than either the height or width of the extension table, and its precise length is intended to ensure that the extension table 82 lies generally coplanar with the work surface 20 of the table saw when the leg is in the extended position. A foot 106 which is variably extensible by about one is preferably provided on the bottom of the main fork 92 of the leg 84 to allow minor leveling adjustments to be made. Finally, the hinges 88 of the extension table assembly 80 are movable in the slot 91 of the guide rail 28 to adjust the relative lateral position of the extension table 82 with respect to the table saw.

While the best mode for carrying out the invention has been described in detail, those familiar with the art to which this invention relates will recognize various alternative designs and embodiments for practicing the invention as defined by the following claims.

What is claimed is:

1. A foldable extension table assembly for supporting a workpiece exiting from a table saw, the table saw having a discharge end and a guide rail attached proximate the discharge end, the extension table assembly comprising:

an extension table having a first end and a second end;

means for pivotably attaching the first end of the extension table to the guide rail of the table saw proximate the discharge end of the table saw;

a leg;

hinge means for pivotably mounting the leg to the extension table to allow the leg to move between a folded position wherein the leg lies substantially flush with the extension table and an extended position wherein the leg rests on the ground;

the leg having a length greater than the distance between the first end of the extension table and a point at which the leg is mounted to the extension table; and locking means for locking the leg in the extended position.

2. The extension table assembly of claim 1 wherein the extension table is movable along the guide rail to adjust the relative lateral position of the extension table with respect to the table saw.

3. The extension table assembly of claim 1 wherein the leg is mounted to the extension table proximate the second end of the extension table.

4. The extension table assembly of claim 1 wherein the extension table is generally planar, and the leg in the extended position extends from the extension table at an angle of about 90 degrees.

5. The extension table assembly of claim 1 wherein the extension table is generally rectangular.

6. The extension table assembly of claim 5 wherein the leg in the folded position lies diagonally across the extension table.

7. The extension table assembly of claim 1 wherein the extension table lies substantially flush with a front side of the table saw when the leg is in the folded position.

8. The extension table assembly of claim 1 wherein the extension table is generally planar and lies generally coplanar with a work surface of the table saw when the leg is in the extended position.

9. A table saw comprising:
   a main saw unit having a discharge end and a guide rail attached proximate the discharge end; and
   a foldable extension table assembly comprising:
      an extension table having a first end and a second end,
      means for pivotably attaching the first end of the extension table to the guide rail of the table saw proximate the discharge end of the table saw,
      a leg,
      hinge means for pivotably mounting the leg to the extension table to allow the leg to move between a folded position wherein the leg lies substantially flush with the extension table and an extended position wherein the leg rests on the ground,
      the leg having a length greater than the distance between the first end of the extension table and a point at which the leg is mounted to the extension table, and
      locking means for locking the leg in the extended position.

10. The table saw of claim 9 wherein the extension table is movable along the guide rail to adjust the relative lateral position of the extension table with respect to the table saw.

11. The table saw of claim 9 wherein the leg is mounted to the extension table proximate the second end of the extension table.

12. The table saw of claim 9 wherein the extension table is generally planar, and the leg in the extended position extends from the extension table at an angle of about 90 degrees.

13. The table saw of claim 9 wherein the extension table is generally rectangular.

14. The table saw of claim 13 wherein the leg in the folded position lies diagonally across the extension table.

15. The table saw of claim 9 wherein the extension table lies substantially flush with a front side of the table saw when the leg is in the folded position.

16. The table saw of claim 9 wherein the extension table is generally planar and lies generally coplanar with a work surface of the table saw when the leg is in the extended position.

17. A foldable extension table assembly for supporting a workpiece exiting from a table saw, the table saw having a discharge end and a guide rail attached proximate the discharge end, the extension table assembly comprising:
   an extension table having a first end and a second end;
   means for pivotably attaching the first end of the extension table to the guide rail of the table saw proximate the discharge end of the table saw;
   a leg;
   hinge means for pivotably mounting the leg to the extension table to allow the leg to move between a folded position wherein the leg lies substantially flush with the extension table and non-orthogonally to the discharge end of the table saw, and an extended position wherein the leg is adapted to support the extension table; and
   locking means for locking the leg in the extended position.

* * * * *

UNITED STATES PATENT AND TRADEMARK OFFICE
CERTIFICATE OF CORRECTION

PATENT NO. : 5,379,815
DATED : January 10, 1995
INVENTOR(S) : BRAZELL ET AL.

It is certified that error appears in the above-indentified patent and that said Letters Patent is hereby corrected as shown below:

Column 1, line 68, after "discharge", insert --end--.

Column 2, line 18, after "the", insert --air--.

Column 2, line 39, after "table", insert --12--.

Column 2, line 45, delete "120", insert --12--.

Column 4, line 25, delete "is".

Column 4, line 30, after "one", insert --inch--.

Signed and Sealed this

Twenty-third Day of May, 1995

Attest:

BRUCE LEHMAN

Attesting Officer        Commissioner of Patents and Trademarks